E. J. GOOD.
BLOWTORCH.
APPLICATION FILED JUNE 26, 1919.

1,368,625.

Patented Feb. 15, 1921.

INVENTOR
Emil J. Good,
BY Frease, Merkel, Saywell and Bond
ATTORNEYS

UNITED STATES PATENT OFFICE.

EMIL J. GOOD, OF CANTON, OHIO.

BLOWTORCH.

1,368,625.     Specification of Letters Patent.     Patented Feb. 15, 1921.

Application filed June 26, 1919. Serial No. 306,811.

*To all whom it may concern:*

Be it known that I, EMIL J. GOOD, a citizen of the United States, residing at Canton, in the county of Stark and State of Ohio, have invented a new and useful Blowtorch, of which the following is a specification.

This invention relates to blow torches and more especially to a nozzle for blow torches such as are used for welding metal.

The objects of the invention are to provide a blow torch with a nozzle which is protected against over heating and prevents back firing of the flame into the fuel tank and to generally simplify the improved construction of blow torch nozzle.

With these objects in view the invention consists in the novel construction and arrangement of parts, hereinafter described, illustrated in the accompanying drawing, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1:
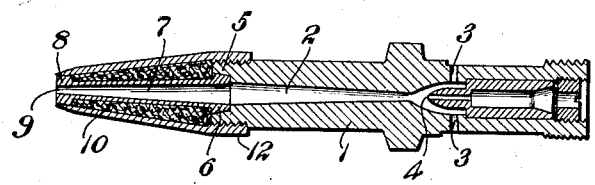
Figure 1 is a longitudinal sectional view through a mixing chamber and nozzle formed in accordance with my invention.
Figure 2:
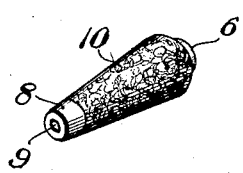
Fig. 2 is a detail perspective view of the nozzle showing the asbestos packing thereon.
Figure 3:
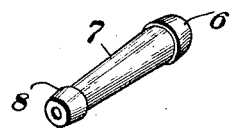
Fig. 3 is a detail perspective view of the nozzle.
Figure 4:
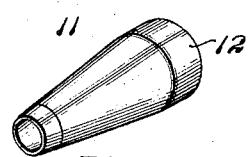

Fig. 4 a detail perspective view of the protecting cap.

A practical embodiment of the invention is disclosed in the accompanying drawings, forming a part of this specification in which similar numerals of reference indicate corresponding parts throughout the several views.

The numeral 1 indicates generally the usual tubular member such as is employed in well known types of blow torches, and is provided with the usual mixing chamber 2, to which gas and air are admitted through the apertures 3 and 4 in the usual manner.

The forward extremity of the tubular member 1 is provided with an outwardly tapered socket 5 which receives the tapered inner extremity 6 of the nozzle 7, said nozzle being preferably tapered toward its outer end and provided with an enlarged tapered tip 8, the central passage 9 being provided through the nozzle communicating with the mixing chamber 2.

It should be noted that the nozzle is reduced in diameter between its tapered extremities 6 and 8, thus forming a cylindrical pocket which is packed with asbestos 10.

The protecting cap 11 is tapered toward its outer end, and provided with the inner screw threaded extremity 12 which is mounted upon suitable external screw threads formed around the end of the tubular member 1, the outer extremity of the cap being of suitable internal diameter to fit snugly upon the tapered extremity 8 of the nozzle, thus retaining the nozzle snugly in place upon the tubular member.

The usual forms of blow torch nozzles are not provided with any protection against excessive heat and it is well known to those skilled in the art that the nozzle frequently becomes overheated while in use allowing a flame to pass back through the usual tube which connects the nozzle with the fuel tank, often causing serious accidents to workmen operating the torch or working in the vicinity thereof as the fuel used in these torches is highly inflammable and often explodes from back firing of the flame.

In using the ordinary form of blow torch nozzles considerable time is often wasted as the nozzles often become overheated in doing such work as closing up holes in metal, the flame being projected backward along the nozzle. It often happens that just at the time that the metal is ready to flow the nozzle has become so overheated that it is necessary to stop work and plunge the nozzle in a bucket of water to cool it before operation can be continued but by this time the metal which is being worked has become cold and the operation must be begun all over thus causing considerable delay.

In the present construction the nozzle is surrounded by the asbestos packing, which is held in place by a protecting cap, thus preventing overheating of the nozzle and obviating the possibility of back firing into the fuel tank.

Although the drawings and above specification discloses the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. In a blow torch, a tubular member provided with an outwardly flared socket at its end, a nozzle provided with an enlarged tapered end fitting said socket, an enlarged tapered portion at the outer end of said nozzle, a tapered tubular protecting cap engaging the outer enlarged portion of the nozzle and attached to the tubular member and asbestos packing located around the nozzle, within the protecting cap, and extending between said enlarged tapered portions of the nozzle.

2. In a blow torch, a tubular member provided with an outwardly flared socket at its end, exterior screw threads upon said end of the tubular member, a nozzle provided with an enlarged tapered end fitting said socket, a second enlarged tapered portion at the outer end of said nozzle, a tapered tubular protecting cap fitting over the outer enlarged portion of the nozzle and provided upon its inner end with internal screw threads fitting the screw threaded end of the tubular member and asbestos packing located around the nozzle, within the protecting cap, and extending between said enlarged tapered portions of the nozzle.

In testimony that I claim the above, I have hereunto subscribed my name.

EMIL J. GOOD.